US006588441B1

(12) United States Patent
Rome et al.

(10) Patent No.: US 6,588,441 B1
(45) Date of Patent: Jul. 8, 2003

(54) FLOW DIRECTION INDICATOR LOOP

(75) Inventors: John A. Rome, Huntington, CA (US); Bill Kavadeles, Carlsbad, CA (US)

(73) Assignee: Motorvac Technologies, Inc., Santa Ana, CA (US)

( * ) Notice: Subject to any disclaimer, the term of this patent is extended or adjusted under 35 U.S.C. 154(b) by 38 days.

(21) Appl. No.: 09/932,187

(22) Filed: Aug. 17, 2001

Related U.S. Application Data

(60) Provisional application No. 60/292,476, filed on May 21, 2001.

(51) Int. Cl.[7] .................................................. F16K 37/00
(52) U.S. Cl. ............................ 137/1; 137/559; 222/159
(58) Field of Search ........................ 137/559, 1; 73/323; 222/159, 154, 40; 431/13

(56) References Cited

U.S. PATENT DOCUMENTS 3,434,513 A * 3/1969 O'Bannon .................. 141/95
5,052,224 A * 10/1991 Ford et al. ................ 73/323 X
5,090,447 A * 2/1992 Lewis et al. ................ 137/559
5,318,080 A 6/1994 Viken
5,447,184 A 9/1995 Betancourt
5,522,474 A 6/1996 Burman
5,918,647 A 7/1999 Liaw
6,062,275 A 5/2000 Rome et al.
6,247,509 B1 6/2001 Rome et al.

* cited by examiner

*Primary Examiner*—Kevin Lee
(74) *Attorney, Agent, or Firm*—Farjami & Farjami LLP

(57) ABSTRACT

An apparatus and method for determining direction of flow in a fluid or pneumatic system. The apparatus comprises first and second conduits having clear portions, the first and second conduits being capable of determining fluid flow direction in the system by observing fluid through their clear portions. The apparatus further comprises a valve assembly connecting the first conduit to the second conduit, the valve assembly including a shut-off valve. The valve assembly can comprise a release valve for releasing fluid from the valve assembly, and a release mechanism for opening the release valve. The system may include a transmission system and a fluid circuit with a first port and a second port, a transmission service system being connected to the first port and the second port of the fluid circuit according to the direction of fluid flow determined by the apparatus.

37 Claims, 8 Drawing Sheets

FLOW DIRECTION INDICATOR LOOP

RELATED APPLICATIONS

The present application claims the benefit of U.S. provisional application serial No. 60/292,476, filed May 21, 2001, which is hereby fully incorporated by reference in the present application.

BACKGROUND OF THE INVENTION

1. Field of the Invention

The present invention relates generally to fluid or pneumatic systems. More particularly, the present invention relates to method and apparatus for determining the direction of flow in such systems.

2. Related Art

The servicing of pressurized fluid systems often requires knowledge of the direction of the fluid in those systems. For example, in the automotive servicing industry, flushing an automatic transmission requires knowledge of the direction of flow of the transmission fluid so that equipment used to flush the transmission can be properly connected to the transmission fluid system. The direction of fluid flow in a vehicle's transmission fluid system could be determined by opening the transmission fluid system with the vehicle turned off, and then starting the vehicle and observing the flow of transmission fluid out of the opened transmission fluid line. However, the above method of determining the direction of fluid flow in a vehicle's transmission fluid system could result in injury to service personnel from hot transmission fluid, or minimally, a mess from spilled transmission fluid. Thus, there is a need for a device to determine the direction of fluid flow in a vehicle transmission fluid system that is safe to operate and does not result in a mess of spilled transmission fluid.

A similar need exists for a device to indicate the direction of fluid flow in automotive, heavy equipment, truck, and bus engine applications including the servicing of power steering, cooling, hydraulic, and air conditioning systems. The power steering, cooling, hydraulic, and air conditioning systems that are used in the automotive, heavy equipment, truck, and bus manufacturing industries typically use a variety of types and sizes of connectors and conduits. Thus, there is a need for a device to determine the direction of fluid flow in the above mentioned power steering, cooling, hydraulic, and air conditioning systems that can connect to the variety of types and sizes of connectors and conduits that these systems contain.

There is a similar need to determine the air flow direction in the servicing of pneumatic systems, such as pressurized air systems and vacuum systems. However, the air flow direction in pneumatic systems can be difficult to determine, especially when air flow is low, since air flow is not readily visible. Sophisticated flow analyzers exist that can determine the direction of low air flow in pneumatic systems. However, these analyzers are typically not cost effective for individual service technicians and small service centers to own and operate.

Therefore, there exists a need for a device to determine the direction of fluid or air flow in a fluid or pneumatic system. More specifically, there exists a need for a device to determine the direction of fluid or air flow in a fluid or pneumatic system that is inexpensive and easy to operate, and is able to connect to a variety of types and sizes of connectors and conduits included in fluid or pneumatic systems.

SUMMARY OF THE INVENTION

The present invention is directed to apparatus and method for determining direction of flow in a fluid or pneumatic system. More specifically, the invention provides an easy to operate, inexpensive apparatus for visually determining direction of fluid or air flow in a system.

In one aspect, such apparatus comprises a first conduit having a clear portion, the first conduit being capable of determining fluid flow direction in the system by observing fluid through its clear portion. The apparatus further comprises a second conduit having a clear portion, the second conduit also being capable of determining fluid flow direction in the system by observing fluid through its clear portion. For example, the clear portions of the first and second conduits can include clear tubes. By way of further example, the first and second conduits can be clear in their entirety.

The apparatus may further comprise a valve assembly connecting the first conduit to the second conduit, the valve assembly including a shut-off valve. The valve assembly can comprise a release valve for releasing fluid from the valve assembly, and a release mechanism for opening the release valve. The system may include a transmission system and a fluid circuit with a first port and a second port, a transmission service system being connected to the first port and the second port of the fluid circuit according to the direction of fluid flow determined by the apparatus. The apparatus may further comprise a number of adapters for connecting the first and second conduits of the apparatus to the first and second ports of the fluid circuit.

These and other aspects of the present invention will become apparent with further reference to the drawings and specification, which follow. It is intended that all such additional systems, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components configured to perform the specified functions. It should be further appreciated that the particular implementations shown and described herein are merely exemplary and are not intended to limit the scope of the present invention in any way.

Figure 1A:
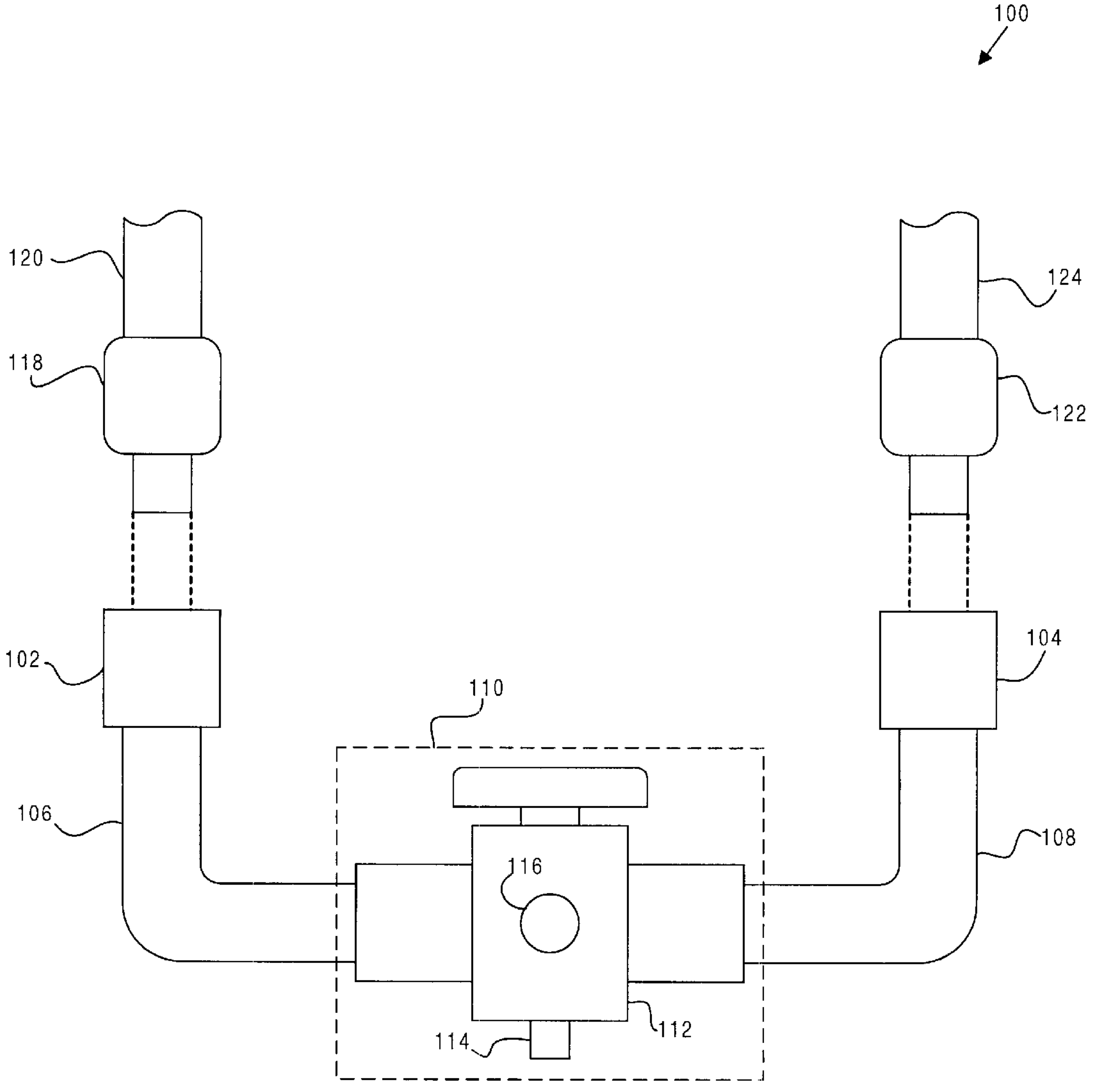
FIG. 1A illustrates a fluid flow indicator loop according to one embodiment of the present invention.

FIG. 1A illustrates an exemplary fluid flow indicator loop in accordance with one embodiment of the present invention. Fluid flow indicator loop 100 in FIG. 1A comprises adapters 102 and 104, clear tubings or conduits 106 and 108, and shutoff valve assembly 110. Shutoff valve assembly 110 includes shutoff valve 112, release valve 114, and release valve button 116.

Now discussing FIG. 1A in more detail, a first end of clear tubing 106 is attached to adapter 102, and a second end of clear tubing 106 is attached to shutoff valve assembly 110. A first end of clear tubing 108 is attached to adapter 104, and a second end of clear tubing 108 is attached to shutoff valve assembly 110. In one embodiment, clear tubings or conduits 106 and 108 may be made of clear plastic reinforced tubing, glass or any other conduit in which flow of fluid may be visually detected, with a typical inside diameter of ⅜ inch. However, the diameter and the length of clear tubings 106 and 108 can vary. Adapters 102 and 104 may be female quick disconnect adapters.

Continuing with FIG. 1A, shutoff valve 112 can be a ball or gate valve, and can be made of brass, PVC plastic, stainless steel, or galvanized steel. The internal diameter of shutoff valve 112 can vary to accommodate different system requirements and flow rates. Release valve 114 is situated on the bottom of shutoff valve assembly 110 and is activated by release valve button 116. However, in other embodiments, release valve 112 may be situated in other locations on shutoff valve assembly 110. Also, in one embodiment, release valve 112 may be activated by a different mechanism, such as a knob or lever.

Also shown in FIG. 1A, a first end of hose 120 is attached to adapter 118, and a second end of hose 120 is attached to a fluid system (not shown in FIG. 1A). A first end of hose 124 is attached to adapter 122, and a second end of hose 124 is also attached to a fluid system (not shown in FIG. 1A). For example, the second ends of hoses 120 and 124 can be attached to first and second ports of pressurized fluid passageways, fluid circuits, or pressurized fluid systems in an automobile, truck, bus, or heavy equipment vehicle. By way of further example, the second ends of hoses 120 and 124 can be attached to an automotive transmission fluid circuit. In one embodiment of the present invention, adapters 118 and 122 can be male quick disconnect adapters. Adapters 118 and 122, respectively, connect to adapters 102 and 104 on fluid flow indicator loop 100 in FIG. 1A. The operation of fluid flow indicator loop 100 will be discussed in detail in relation to FIG. 2.

Figure 1B:
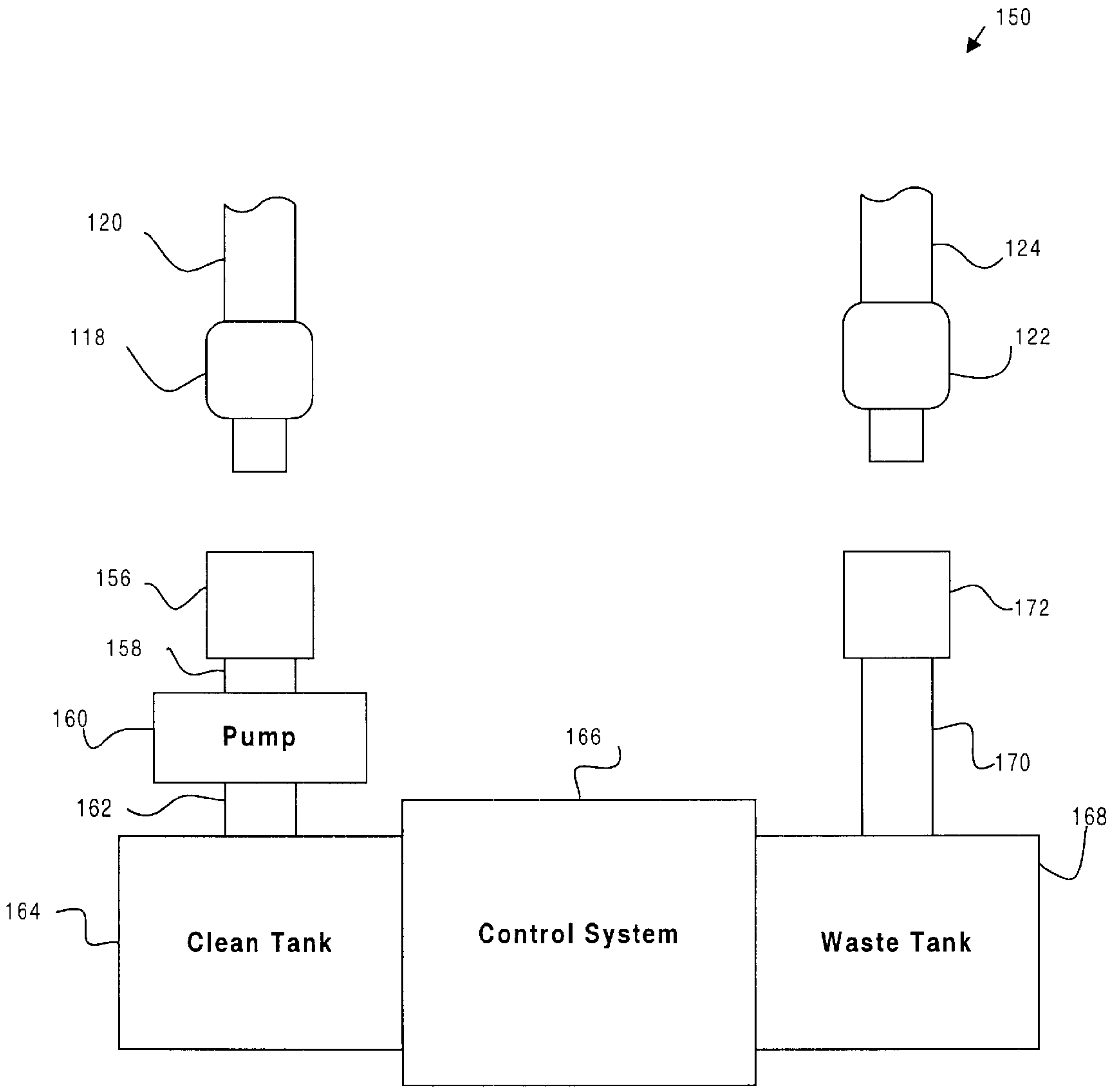
FIG. 1B illustrates an application of the fluid flow indicator loop of FIG. 1A.

FIG. 1B illustrates an exemplary transmission service system. In one embodiment, transmission service system 150 may be used to replace waste fluid with fresh fluid in a vehicle's transmission after fluid flow indicator loop 100 in FIG. 1A is used to determine the fluid flow direction in hoses 120 and 124 of transmission service systems 150, as described in FIG. 2, and thereafter removed from the vehicle's transmission fluid circuit. Transmission service system 150 includes adapters 156 and 172, tubings 158, 162, and 170, pump 160, clean tank 164, control system 166, and waste tank 168.

In FIG. 1B, a first end of hose 120 is attached to adapter 118, and a second end of hose 120 is attached to a vehicle's transmission fluid circuit (not shown in FIG. 1B). A first end of hose 124 is attached to adapter 122, and a second end of hose 124 is also attached to a vehicle's transmission fluid circuit not shown in FIG. 1B. Hoses 120 and 124 are appropriately determined as "fluid in" and "fluid out" after fluid flow direction has been determined by fluid flow indicator loop 100 in FIG. 1A. Hoses 120 and 124 are then connected to adapters 156 and 172 of transmission service system 150 via adapters 118 and 122. For example, if hose 120 was determined as "fluid in" and hose 124 was determined as "fluid out," adapters 118 and 122, respectively, would be connected to adapters 156 and 172 in FIG. 1B. In the above example, fresh fluid would be pumped through hose 120 from clean tank 164 by pump 160, and waste fluid would be drained into waste tank 168 through hose 124. In one embodiment, control system 166 would automatically determine the required amount of clean fluid that would be pumped through hose 120 to fill the vehicle's transmission (not shown in FIG. 1B). By way of further example, if hose 124 was determined as "fluid in" and hose 120 was determined as "fluid out," adapters 122 and 118, respectively, would be connected to adapters 156 and 172 in FIG. 1B.

Figure 2:
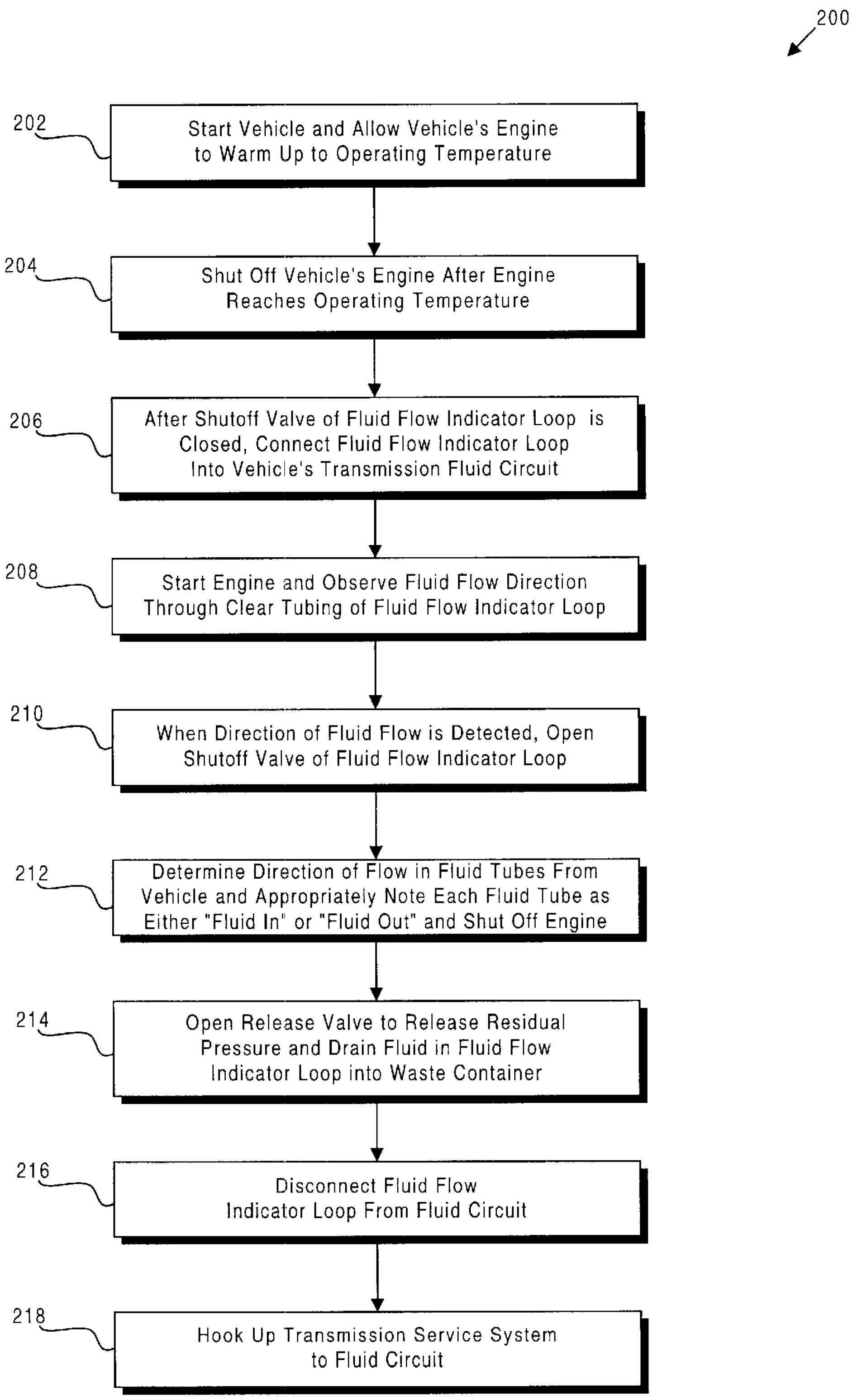
FIG. 2 illustrates a flow diagram describing a method of using the fluid indicator loop of FIG. 1A.

In flowchart 200 of FIG. 2, the operation of an embodiment of the present invention is illustrated by connecting fluid flow indicator loop 100 (see FIG. 1A) to a vehicle's transmission fluid circuit. Although a vehicle's transmission fluid circuit is used to illustrate the operation of an embodiment of present invention in FIG. 2, the present invention can be used to determine the direction of fluid flow in various fluid systems. For example, the present invention can detect fluid flow direction in automotive, truck, bus, and heavy equipment applications including power steering, cooling, hydraulic, and air conditioning systems. Additionally, an embodiment of the present invention can be used for testing air flow direction in air or pneumatic systems.

Continuing with FIG. 2, at step 202, a vehicle comprising a transmission fluid circuit to be serviced is started up and the vehicle's engine is allowed to reach operating temperature. At step 204, the vehicle's engine is shut off after the engine reaches operating temperature. In other words, preferably, flow of fluid through the transmission fluid circuit of the vehicle is substantially stopped. At step 206, after ensuring that shutoff valve 112 is closed, fluid flow indicator loop 100 is connected into the transmission fluid circuit of the vehicle. For example, in FIG. 1A, adapters 118 and 122, respectively, would connect the first ends of hoses 120 and 124 to adapters 102 and 104 of fluid flow indicator loop 100. The second ends of hoses 120 and 124 (not shown in FIG. 1A) would be connected into the transmission fluid circuit of the vehicle. In one embodiment, adapters 118 and 122, and hoses 120 and 124 are a part of an adapter kit, including a plurality of various sizes and length of hoses, hose clamps, fuel lines, washers, bolts, unions, nuts, fuel pressure lines, cooler lines, etc. The adapters in the adapter kit allow fluid flow indicator loop 100 to accommodate the different fluid system connectors that are used in the automotive, trucking, bus, and industrial equipment industries. It should be noted that in other embodiments, flowchart 200 may begin at step 206 and fluid flow indicator loop 100 may be connected to any fluid circuit in order to determine the direction of fluid flow in that fluid circuit; therefore, use of fluid flow indicator loop 100 to determine the direction of fluid flow in a vehicle's transmission fluid circuit is merely exemplary.

Referring back to FIG. 2, at step 208, the vehicle's engine is started to allow flow of fluid into the fluid circuit and the fluid flow direction is observed, e.g. by visual detection, through the clear tubing of fluid flow indicator loop 100. For example, in FIG. 1A, fluid flow will be observed in clear tubing 106 if fluid is flowing out of hose 120, which is connected to clear tubing 106 via adapters 118 and 102. By way of further example, fluid flow will be observed in clear tubing 108 if fluid is flowing out of hose 124, which is connected to clear tubing 108 via adapters 122 and 104. At step 210, shutoff valve 112 of fluid flow indicator loop 100 is opened after the direction of fluid flow is detected to allow normal circulation of transmission fluid and thereby prevent damage to the vehicle's transmission.

At step 212, the vehicle's engine is shut off, and the hoses from the vehicle's transmission fluid circuit that are connected to the fluid flow indicator loop 100 are appropriately determined as "fluid in" and "fluid out." For example, if fluid flow was detected in clear tubing 106 in FIG. 1A, hose 120 would be determined as "fluid out" and hose 124 would be determined as "fluid in." By way of further example, if fluid flow was detected in clear tubing 108 in FIG. 1A, hose 124 would be determined as "fluid out" and hose 120 would be determined as "fluid in." At step 214, release valve 114 is opened to release residual pressure and to allow fluid in fluid flow indicator loop 100 to drain into a waste container. At step 216, fluid flow indicator loop 100 is disconnected from the vehicle's transmission fluid circuit. It should be noted that in some embodiments, step 216 may be the last step of flowchart 200, wherein after fluid flow indicator loop 100 is disconnected, the fluid circuit is also re-established.

However, in some other embodiments, at step 218, a transmission service system, such as transmission service system 150 in FIG. 1B, is connected to the vehicle's transmission fluid circuit. For example, if hose 120 in FIG. 1B was determined as "fluid in" and hose 124 was determined as "fluid out" at step 212, hose 120 would be connected to transmission service system 150 via adapters 118 and 156, and hose 124 would be connected to transmission service system 150 via adapters 122 and 172. Thus, fresh fluid would be pumped into the vehicle's transmission fluid circuit from clean tank 164 via hose 120 in FIG. 1B, and waste fluid would be drained out of the vehicle's transmission fluid circuit into waste tank 168 via hose 124.

Figure 3A:
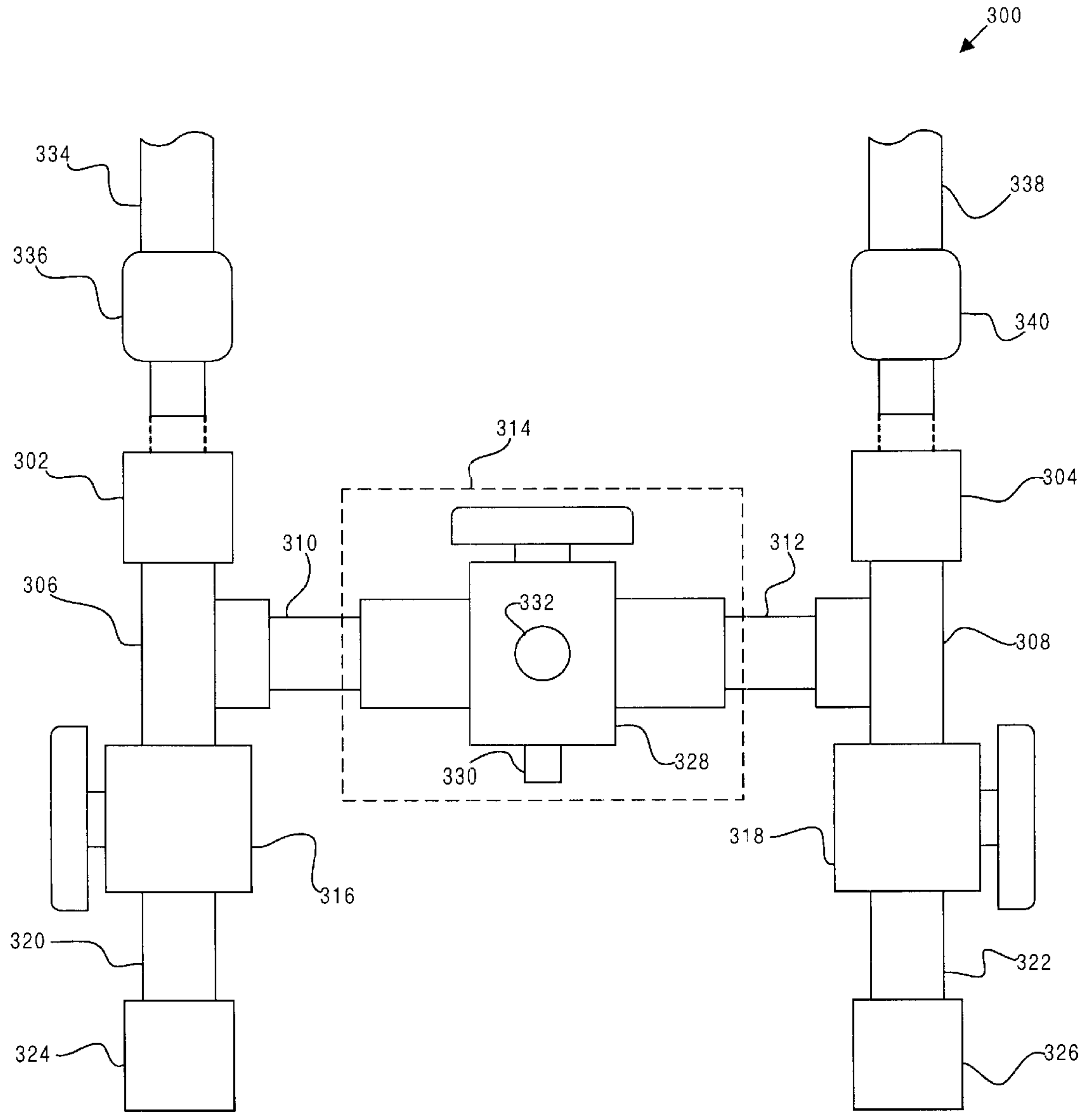
FIG. 3A illustrates a fluid flow indicator loop according to one embodiment of the present invention.

FIG. 3A illustrates an exemplary fluid flow indicator loop in accordance with another embodiment of the present invention. Fluid flow indicator loop 300 in FIG. 3A comprises adapters 302, 304, 324, and 326, tee fittings 306 and 308, clear tubings 310 and 312, shutoff valve assembly 314, shutoff valves 316 and 318, and tubings 320 and 322. Shutoff valve assembly 314 comprises shutoff valve 328, release valve 330, and release button 332.

Now discussing FIG. 3A in more detail, a first end of tee fitting 306 is attached to adapter 302, and a second end of tee fitting 306 is attached to shutoff valve 316. A first end of tee fitting 308 is attached to adapter 304, and a second end of tee fitting 308 is attached to shutoff valve 318. In one embodiment of the present invention, adapters 302 and 304 can be female quick disconnect adapters. Shutoff valves 316, 318, and 328 can be ball or gate valves, and can be made of brass, PVC plastic, stainless steel, or galvanized steel. The internal diameter of shutoff valves 316, 318, and 328 can vary to accommodate different system requirements and flow rates.

Continuing with FIG. 3A, a first end of clear tubing 310 is attached to tee fitting 306, and a second end of clear tubing 310 is attached to shutoff valve assembly 314. A first end of clear tubing 312 is attached to tee fitting 308, and a second end of clear tubing 312 is attached to shutoff valve assembly 314. Clear tubings or conduits 310 and 312 may be made of clear plastic reinforced tubing, glass or any other conduit in which flow of fluid may be visually detected, with a typical inside diameter of ⅜ inch. However, the diameter and the length of clear tubings 310 and 312 may vary in other embodiments. Release valve 330 is situated on the bottom of shutoff valve assembly 314 and is activated by release valve button 332. However, in other embodiments, release valve 330 may be situated in other locations on shutoff valve assembly 314. Also, in another embodiment release valve 330 may be activated by a different mechanism, such as a knob or lever.

Also in FIG. 3A, a first end of tubing 320 is attached to shutoff valve 316, and a second end of tubing 320 is attached to adapter 324. A first end of tubing 322 is attached to shutoff valve 318, and a second end of tubing 322 is attached to adapter 326. In one embodiment of the present invention, adapters 324 and 326 can be female quick disconnect adapters.

Also shown in FIG. 3A, a first end of hose 334 is attached to adapter 336, and a second end of hose 334 is attached to a fluid system (not shown in FIG. 1A). A first end of hose 338 is attached to adapter 340, and a second end of hose 338 is also attached to a fluid system (not shown in FIG. 1A). For example, the second ends of hoses 334 and 338 can be attached to first and second ports of pressurized fluid passageways, fluid circuits, or pressurized fluid systems in an automobile, truck, bus, or heavy equipment vehicle. By way of further example, the second ends of hoses 334 and 338 can be attached to an automotive transmission fluid circuit. In one embodiment of the present invention, adapters 336 and 340 can be male quick disconnect adapters. Adapters 336 and 340, respectively, connect to adapters 302 and 304 on fluid flow indicator loop 300 in FIG. 3A. The operation of fluid flow indicator loop 300 will be discussed in detail in relation to FIG. 4.

Figure 3B:
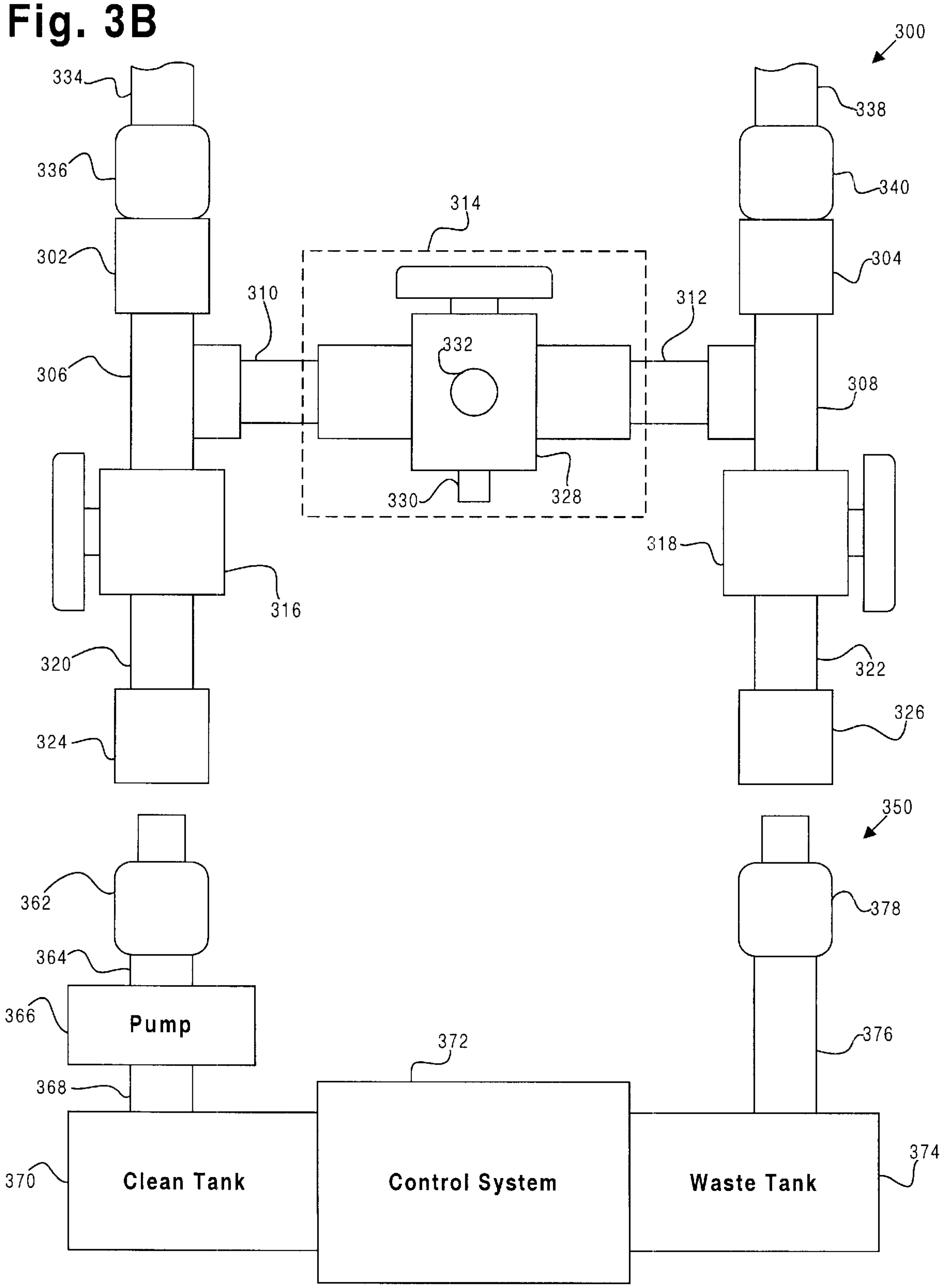
FIG. 3B illustrates an application of the fluid flow indicator loop of FIG. 3A.

FIG. 3B illustrates an exemplary transmission service system prior to connection to fluid flow indicator loop 300. In one application of the present invention, transmission service system 350 in FIG. 3B may be connected to fluid flow indicator loop 300 to replace waste fluid with clean fluid in a vehicle's transmission (not shown in FIG. 3B). Transmission service system 350 includes adapters 362 and 378, tubings 364, 368, and 376, pump 366, clean tank 370, control system 372, and waste tank 374. Fluid flow indicator loop 300 in FIG. 3B comprises adapters 302, 304, 324, and 326, tee fittings 306 and 308, clear tubings 310 and 312, shutoff valve assembly 314, shutoff valves 316 and 318, and tubings 320 and 322. Shutoff valve assembly 314 comprises shutoff valve 328, release valve 330, and release button 332.

Now discussing FIG. 3B in more detail, a first end of tee fitting 306 is attached to adapter 302, and a second end of tee fitting 306 is attached to shutoff valve 316. A first end of tee fitting 308 is attached to adapter 304, and a second end of tee fitting 308 is attached to shutoff valve 318. In one embodiment of the present invention, adapters 302 and 304 can be female quick disconnect adapters; Shutoff valves 316, 318, and 328 can be ball or gate valves, and can be made of brass, PVC plastic, stainless steel, or galvanized steel. The internal diameter of shutoff valves 316, 318, and 328 may vary to accommodate different system requirements and flow rates.

Continuing with FIG. 3B, a first end of clear tubing 310 is attached to tee fitting 306, and a second end of clear tubing 310 is attached to shutoff valve assembly 314. A first end of clear tubing 312 is attached to tee fitting 308, and a second end of clear tubing 312 is attached to shutoff valve assembly 314. Clear tubings 310 and 312 can be made of clear plastic reinforced tubing, with a typical inside diameter of ⅜ inch, which may vary. Release valve 330 is situated on the bottom of shutoff valve assembly 314 and is activated by release valve button 332. However, in other embodiments, release valve 330 may be situated in other locations on shutoff valve assembly 314. Also, in another embodiment release valve 330 may be activated by a different mechanism, such as a knob or lever. A first end of tubing 320 is attached to shutoff valve 316, and a second end of tubing 320 is attached to adapter 324. A first end of tubing 322 is attached to shutoff valve 318, and a second end of tubing 322 is attached to adapter 326. In one embodiment of the present invention, adapters 324 and 326 can be female quick disconnect adapters.

In FIG. 3B, a first end of hose 334 is attached to adapter 336, and a second end of hose 334 is attached to a vehicle's transmission fluid circuit (not shown in FIG. 3B). A first end of hose 338 is attached to adapter 340, and a second end of hose 338 is also attached to a vehicle's transmission fluid circuit (not shown in FIG. 3B). Hose 334 is connected to adapter 302 on fluid flow indicator loop 300 via adapter 336. Hose 338 is connected to adapter 304 on fluid flow indicator loop 300 via adapter 340. Hoses 334 and 338 are appropriately determined as either "fluid in" or "fluid out" after fluid flow direction has been determined by fluid flow indicator loop 300 in FIG. 3A. Based on such determination, fluid flow indicator loop 300 is connected to transmission service system 350 in FIG. 3B. For example, if hose 334 is determined as "fluid in" and hose 338 is determined as "fluid out," adapters 324 and 326, respectively, on fluid flow indicator loop 300 are connected to adapters 362 and 378 on transmission service system 350. In the above example, fresh fluid would be pumped through hose 334 from clean tank 370 by pump 366, and waste fluid would be drained into waste tank 374 through hose 338. In one embodiment, control system 372 would determine the required amount of fresh fluid that would be pumped through hose 334 to fill the vehicle's transmission (not shown in FIG. 3B).

By way of further example, if hose 338 is determined as "fluid in" and hose 334 is determined as "fluid out," adapters 326 and 324, respectively, on fluid flow indicator loop 300 are connected to adapters 362 and 378 on transmission service system 350 in FIG. 3B. In the above example, fresh fluid would be pumped through hose 338 from clean tank 370 by pump 366, and waste fluid would be drained into waste tank 374 through hose 334.

Figure 4:
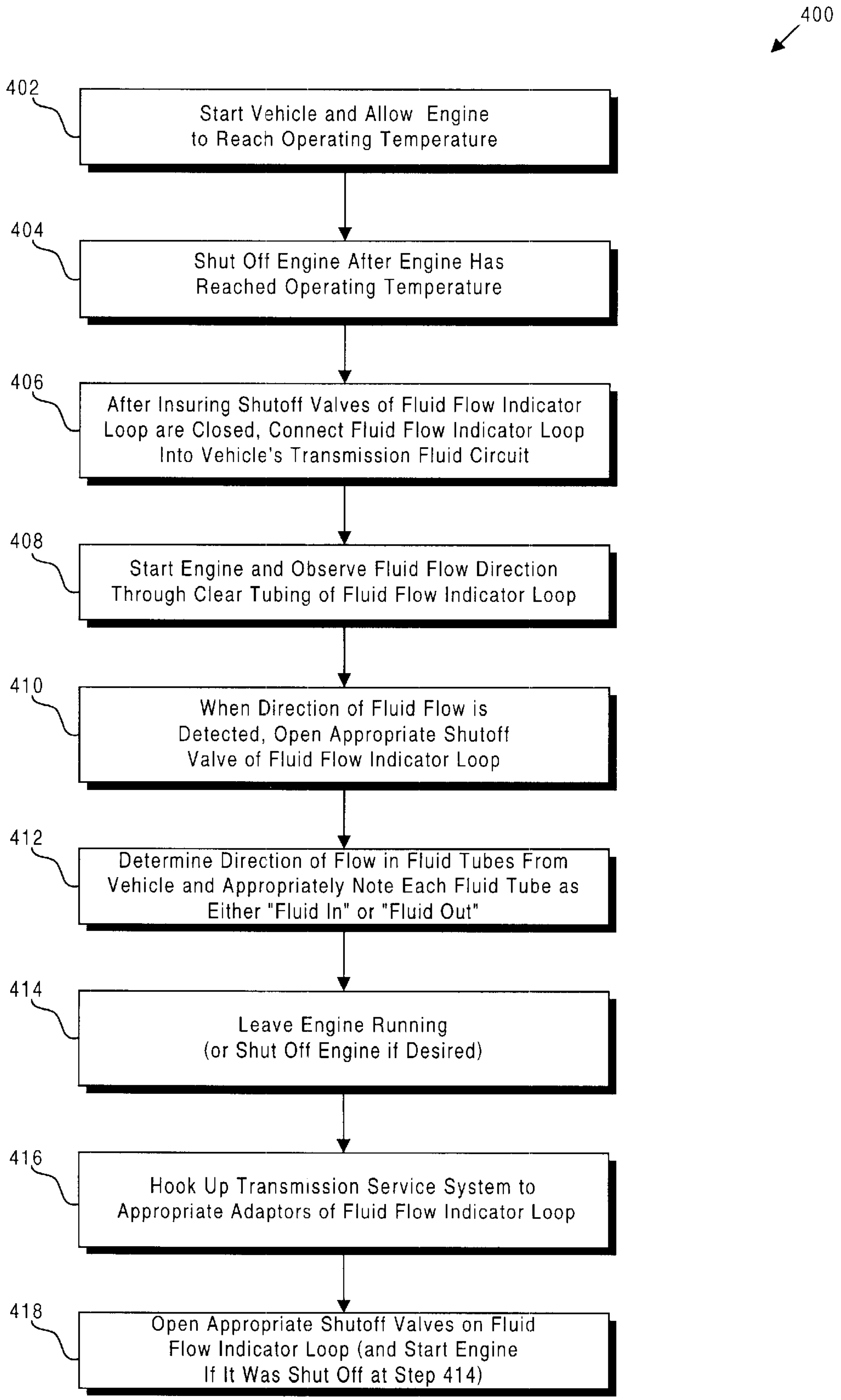
FIG. 4 illustrates a flow diagram describing a method of using the fluid indicator loop of FIG. 3A.

In flowchart 400 of FIG. 4, the operation of an embodiment of the present invention is illustrated by connecting fluid flow indicator loop 300 in FIGS. 3A and 3B to a vehicle's transmission fluid circuit. Although a vehicle's transmission fluid circuit is used to illustrate the operation of an embodiment of present invention in FIG. 4, the present invention can be used to determine the direction of fluid flow in various fluid systems. For example, the present invention can detect fluid flow direction in automotive, truck, bus, and heavy equipment applications including power steering, cooling, hydraulic, and air conditioning systems. Additionally, an embodiment of the present invention can be used for testing flow direction in air or pneumatic systems.

Referring to FIG. 4, at step 402, a vehicle comprising a transmission fluid circuit to be serviced is started up and the vehicle's engine is allowed to reach operating temperature. At step 404, the vehicle's engine is shut off after the engine reaches operating temperature. In other words, preferably, flow of fluid through the transmission fluid circuit of the vehicle is substantially stopped. At step 406, after ensuring that shutoff valves 316, 318, and 328 in FIG. 3A, are closed, fluid flow indicator loop 300 is connected into the transmission fluid circuit of the vehicle. For example, in FIG. 3A, adapters 336 and 340, respectively, would connect the first ends of hoses 334 and 338 to adapters 302 and 304 of fluid flow indicator loop 300. The second ends of hoses 334 and 338 (not shown in FIG. 3A) would be connected into the transmission fluid circuit of the vehicle. Adapters 336 and 340, and hoses 334 and 338 are included in the adapter kit. It should be noted that in other embodiments, flowchart 400 may begin at step 406 and fluid flow indicator loop 300 may be connected to any fluid circuit in order to determine the direction of fluid flow in that fluid circuit; therefore, use of fluid flow indicator loop 300 to determine the direction of fluid flow in a vehicle's transmission fluid circuit is merely exemplary.

At step 408, the vehicle's engine is started to allow flow of fluid into the fluid circuit and the fluid flow direction is observed through the clear tubing of fluid flow indicator loop 300. For example, in FIG. 3A, fluid flow will be observed in clear tubing 310 if fluid is flowing out of hose 334, which is connected to clear tubing 310 via adapters 336 and 302, and tee fitting 306. By way of further example, fluid flow will be observed in clear tubing 312 if fluid is flowing out of hose 338, which is connected to clear tubing 312 via adapters 340 and 304, and tee fitting 308. At step 410, after the direction of fluid flow is detected, shutoff valve 328 in fluid flow indicator loop 300 in FIG. 3A is opened to allow normal circulation of transmission fluid and thereby prevent damage to the vehicle's transmission.

At step 412, the hoses from the vehicle's transmission fluid circuit that are connected to fluid flow indicator loop 300 are appropriately determined as "fluid in" and "fluid out." For example, if fluid flow was detected in clear tubing 310 in FIG. 3A, hose 334 would be determined as "fluid out" and hose 338 would be determined as "fluid in." By way of further example, if fluid flow was detected in clear tubing 312 in FIG. 3A, hose 338 would be determined as "fluid out" and hose 334 would be determined as "fluid in." At step 414, the vehicle's engine is either shut off or, in a preferred embodiment, is left running, since fluid flow indicator loop 300 allows the vehicle's transmission fluid circuit to be serviced without shutting off the vehicle's engine.

At step 416, a transmission service system, such as transmission service system 350 in FIG. 3B, is connected to the vehicle's transmission fluid circuit. For example, if hose 334 was determined as "fluid in" and hose 338 was determined as "fluid out," adapters 324 and 326, respectively, on fluid flow indicator loop 300 are connected to adapters 362 and 378 on transmission service system 350. By way of further example, if hose 338 was determined as "fluid in" and hose 334 was determined as "fluid out," adapters 326 and 324, respectively, on fluid flow indicator loop 300 are connected to adapters 362 and 378 on transmission service system 350 in FIG. 3B.

At step 418, shutoff valve 328 of fluid flow indicator loop 300 in FIGS. 3A and 3B is closed, and shutoff valves 316 and 318 are opened. The vehicle's engine is restarted if it was shut off at step 414; however, in a preferred embodiment, the vehicle's engine is not shut off at step 414 and restarting of the vehicle's engine is not necessary. The vehicle's transmission fluid circuit is now able to receive fresh fluid from clean tank 370 on transmission service system 350 in FIG. 3B, and deposit waste fluid in waste tank 374.

Figure 5:
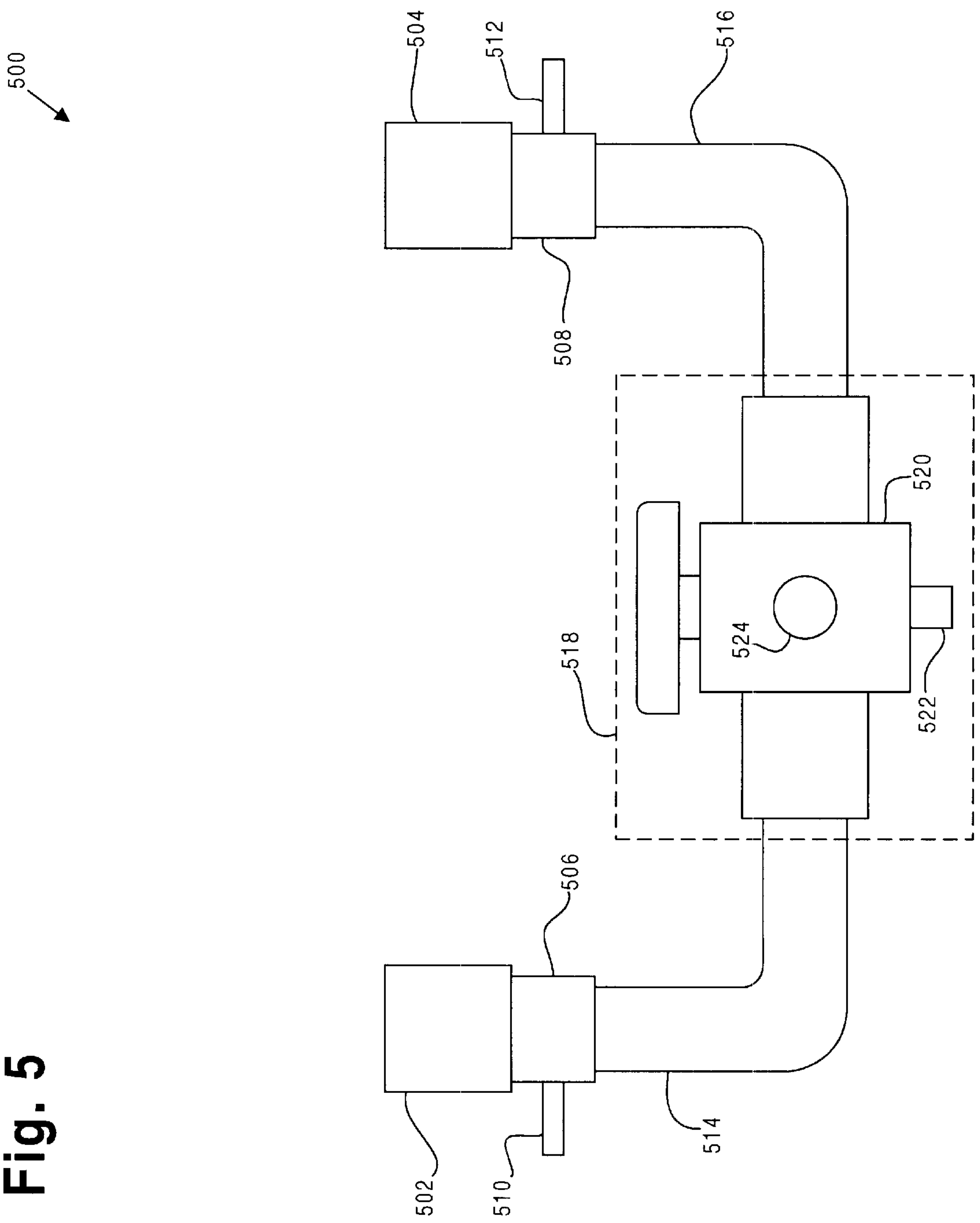
FIG. 5 illustrates a flow indicator loop according to one embodiment of the present invention.

FIG. 5 illustrates an exemplary flow indicator loop in accordance with one embodiment of the present invention.

Flow indicator loop 500 in FIG. 5 comprises adapters 502 and 504, one way check valves 506 and 508, check valve nozzles 510 and 512, clear tubings 514 and 516, and shutoff valve assembly 518. Shutoff valve assembly 518 comprises shutoff valve 520, release valve 522, and release button 524.

Now discussing FIG. 5 in more detail, adapters 502 and 504, respectively, are attached to one way check valves 506 and 508. In one embodiment of the present invention, adapters 502 and 504 can be female quick disconnect adapters. Check valve nozzles 510 and 512, respectively, are attached to one way check valves 506 and 508. A first end of clear tubing 514 is attached to one way check valve 506, and a second end of clear tubing 514 is attached to shutoff valve assembly 518. A first end of clear tubing 516 is attached to one way check valve 508, and a second end of clear tubing 516 is attached to shutoff valve assembly 518. Clear tubings or conduits 514 and 516 can be made of clear plastic reinforced tubing, glass or any other conduit in which vapor, smoke or any gaseous flow may be visually detected, with a typical inside diameter of ⅜ inch, which may vary.

Continuing with FIG. 5, shutoff valve 520 can be a ball or gate valve, and can be made of brass, PVC plastic, stainless steel, or galvanized steel. The internal diameter of shutoff valve 520 can vary to accommodate different system requirements and flow rates. Release valve 522 is situated on the bottom of shutoff valve assembly 518 and is activated by release valve button 524. However, in other embodiments, release valve 522 may be situated in other locations on shutoff valve assembly 518. Also, in another embodiment release valve 522 may be activated by a different mechanism, such as a knob or lever.

An air or pneumatic system (not shown in FIG. 5) can be connected to flow indicator loop 500 via adapters 502 and 504. A smoke and luminescent mixture can then be injected through either check valve nozzle 510 or 512 of flow indicator loop 500. Air flow can thus be detected by observing the direction of smoke travel through clear tubings 514 and 516 of flow indicator loop 500. For an air or pneumatic system with very low air flow, visual detection of smoke travel through clear tubings 514 and 516 can be assisted through the use of a black light.

Figure 6:
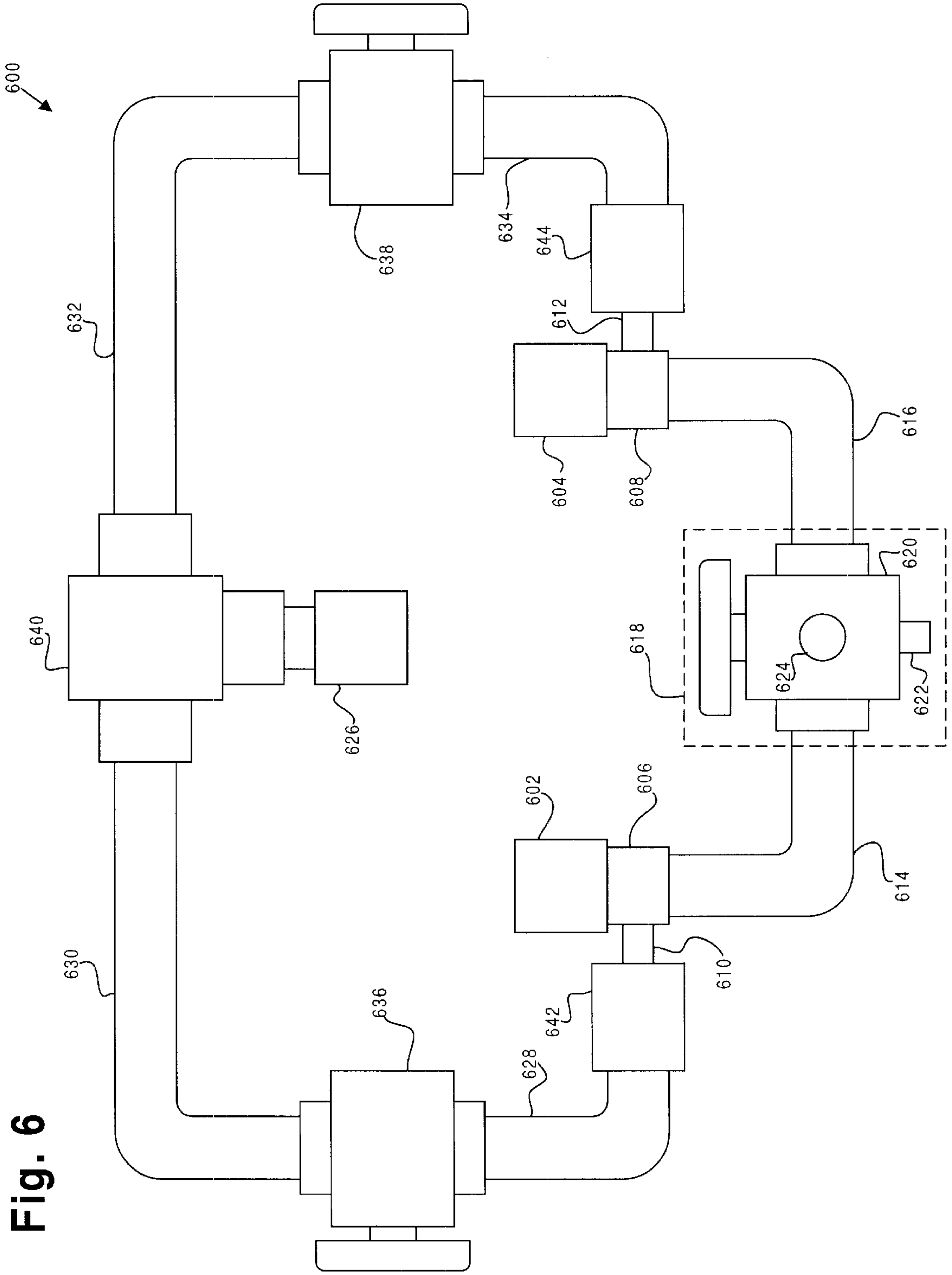
FIG. 6 illustrates a flow indicator loop according to one embodiment of the present invention.

FIG. 6 illustrates an exemplary flow indicator loop in accordance with one embodiment of the present invention. Flow indicator loop 600 in FIG. 6 comprises adapters 602, 604, and 626, one way check valves 606 and 608, check valve nozzles 610 and 612, clear tubings 614, 616, 628, 630, 632, and 634, shutoff valves 636 and 638, tee connector block 640, connectors 642 and 644, and shutoff valve assembly 618. Shutoff valve assembly 618 comprises shutoff valve 620, release valve 622, and release button 624.

Now discussing FIG. 6 in more detail, adapters 602 and 604, respectively, are attached to one way check valves 606 and 608. In one embodiment of the present invention, adapters 602 and 604 can be female quick disconnect adapters. Check valve nozzles 610 and 612, respectively, are attached to one way check valves 606 and 608. A first end of clear tubing 614 is attached to one.way check valve 606, and a second end of clear tubing 614 is attached to shutoff valve assembly 618. A first end of clear tubing 616 is attached to one way check valve 608, and a second end of clear tubing 616 is attached to shutoff valve assembly 618. Clear tubings or conduits 614 and 616 can be made of clear plastic reinforced tubing, glass or any other conduit in which vapor, smoke or any gaseous flow may be visually detected, with a typical inside diameter of ⅜ inch, which may vary.

Continuing with FIG. 6, shutoff valve 620 can be a ball or gate valve, and can be made of brass, PVC plastic, stainless steel, or galvanized steel. The internal diameter of shutoff valve 620 can vary to accommodate different system requirements and flow rates. Release valve 622 is situated on the bottom of shutoff valve assembly 618 and is activated by release valve button 624. However, in other embodiments, release valve 622 may be situated in other locations on shutoff valve assembly 618. Also, in another embodiment release valve 622 may be activated by a different mechanism, such as a knob or lever.

Also shown in FIG. 6, connector 642 is attached to check valve nozzle 610. A first end of clear tubing 628 is attached to connector 642, and a second end of clear tubing 628 is attached to shutoff valve 636. A first end of clear tubing 630 is attached to shutoff valve 636, and a second end of clear tubing 630 is attached to tee connector block 640. Adapter 626 is attached to tee connector block 640. In one embodiment of the present invention, adapter 626 can be a female quick disconnect adapter. A first end of clear tubing 632 is attached to tee connector block 640, and a second end of clear tubing 632 is attached to shutoff valve 638. A first end of clear tubing 634 is attached to shutoff valve 638, and a second end of clear tubing 634 is attached to connector 644. Connector 644 is attached to check valve nozzle 612. Shutoff valves 636 and 638 can be ball or gate valves, and can be made of brass, PVC plastic, stainless steel, or galvanized steel. The internal diameter of shutoff valves 636 and 638 can vary to accommodate different system requirements and flow rates. Clear tubings 628, 630, 632, and 634 can comprise clear plastic reinforced tubing, with a typical inside diameter of ⅜ inch, which may vary.

An air or pneumatic system (not shown in FIG. 6) can be connected to flow indicator loop 600 via adapters 602 and 604. A vapor mixture can then be injected through adapter 626 of flow indicator loop 600. In one embodiment, the vapor mixture can be a smoke and luminescent mixture. Air flow can thus be detected by observing the direction of vapor travel through clear tubings 614, 616, 628, 630, 632, and 634 of flow indicator loop 600. A vapor mixture can be injected through either check valve nozzle 610 or check valve nozzle 612 of flow indicator loop 600 in FIG. 6. For example, a vapor mixture may be injected through check valve nozzle 610 by opening shutoff valve 636, closing shutoff valve 638, and injecting a vapor mixture through adapter 626. By way of further example, a vapor mixture may be injected through check valve nozzle 612 by closing shutoff valve 636, opening shutoff valve 638, and injecting a vapor mixture through adapter 626. Thus flow indicator loop 600 allows a vapor mixture to be injected into an air or pneumatic system through a single adapter, i.e. adapter 626. Flow indicator loop 600 further allows the injected vapor mixture to be diverted through either of two check valve nozzles, i.e. check valve nozzles 610 and 612, by opening and closing the appropriate shutoff valves, i.e. shutoff valves 636 and 638 in FIG. 6.

A novel method and system for determining the direction of fluid or air flow in a fluid, air or pneumatic system has been hereby presented. The present invention may be embodied in other specific forms without departing from its spirit or essential characteristics. The described embodiments are to be considered in all respects only as illustrative and not restrictive. Those skilled in the art will recognize that changes and modifications may be made to the embodiments without departing from the scope of the present invention. These and other changes or modifications are intended to be included within the scope of present invention, as broadly described herein.

What is claimed is:

1. An apparatus for determining a direction of flow of a fluid in a system including a transmission system and a fluid circuit, said fluid circuit having a first port and a second port, said apparatus comprising:

a first conduit having a clear portion;

a second conduit having a clear portion; and a valve assembly including a shut-off valve, said valve assembly connecting said first conduit to said second conduit;

wherein said first conduit is coupled to said first port and said second conduit is coupled to said second port, wherein said shut-off valve is closed to prevent flow of said fluid between said first conduit and said second conduit, wherein said direction is determined by visually observing said fluid in one of said conduits through its said clear portion, and wherein a transmission service system is connected to said ports according to said direction.

2. The apparatus of claim 1, wherein said clear portions include clear tubes.

3. The apparatus of claim 1, wherein said valve assembly includes:

a release valve; and a release mechanism;

wherein said release mechanism is used to open said release valve for releasing said fluid from said valve assembly.

4. The apparatus of claim 1, wherein each said conduit is clear in its entirety.

5. The apparatus of claim 1 further comprising a plurality of adapters for coupling said conduits to said ports.

6. A method of detecting a direction of flow of a fluid in a system including a transmission system and a fluid circuit, said fluid circuit having a first port and a second port, said method comprising the steps:

coupling a first conduit to said first port, said first conduit having a clear portion;

coupling a second conduit to said second port, said second conduit having a clear portion, wherein a valve connects said first conduit to said second conduit, said valve assembly includes a shut-off valve;

closing said shut-off valve to prevent flow of said fluid between said first conduit and said second conduit;

visually observing said direction of flow of said fluid in one of said conduits through its said clear portion;

decoupling said conduits from said ports; and connecting a transmission service system to said ports according to said observing step.

7. The method of claim 6, wherein said clear portions include clear tubes.

8. The method of claim 6, wherein said valve assembly further includes a release valve and release mechanism, said method further comprising the step of utilizing said release mechanism to open said release valve for releasing said fluid from said valve assembly.

9. The method of claim 6, wherein each said conduit is clear in its entirety.

10. The method of claim 6 further comprising the step of opening said shut-off valve to allow flow of said fluid between said first and said second conduits after said observing step.

11. An apparatus for determining a direction of flow of a fluid in a system having a first port and a second port, said apparatus comprising:

a first conduit having a clear portion, a first end and a second end;

a second conduit having a clear portion, a first end and a second end; and a first valve connecting said first end of said first conduit to said first end of said second conduit;

a second valve connected to said second end of said first conduit;

a third valve connected to said second end of said second conduit;

wherein said second end of said first conduit is coupled to said first port and said second end of said second conduit is coupled to said second port, wherein said valves are closed, and wherein said direction is determined by visually observing said fluid in one of said conduits through its said clear portion.

12. The apparatus of claim 11, wherein said clear portions include clear tubes.

13. The apparatus of claim 11, wherein said first valve includes:

a release valve; and a release mechanism;

wherein said release mechanism is used to open said release valve for releasing said fluid from said first valve.

14. The apparatus of claim 11, wherein said system includes a transmission system and a fluid circuit, said fluid circuit includes said first port and said second port, and wherein a transmission service system is connected to said second valve and said third valve according to said direction.

15. The apparatus of claim 14, wherein said second valve and said third valve are opened to allow flow of said fluid to said system and flow of a new fluid from said system.

16. The apparatus of claim 11, wherein each said conduit is clear in its entirety.

17. The apparatus of claim 11, further comprising a plurality of adapters for coupling said conduits to said ports.

18. A method of detecting a direction of flow of a fluid in a system having a first port and a second port, said method comprising the steps:

coupling a first end of a first conduit to said first port, said first conduit having a clear portion and a second end;

coupling a first end of a second conduit to said second port, said second conduit having a clear portion and a second end, wherein a first valve connects said second end of first conduit to said second end of said second conduit, said first end of said first conduit is connected to a second valve and said first end of said second conduit is connected to a third valve;

closing said valves; and visually observing said direction of flow of said fluid in one of said conduits through its said clear portion.

19. The method of claim 18, wherein said clear portions include clear tubes.

20. The method of claim 18, further comprising the step of releasing said fluid from said first valve.

21. The method of claim 18, wherein said system includes a transmission system and a fluid circuit, and wherein said fluid circuit includes said first port and said second port, said method further comprising the steps of:

opening said first valve; and connecting a transmission service system to said second valve and said third valve according to said observing step.

22. The method of claim 21 further comprising the steps of:

closing said first valve; and opening said second valve and said third valve.

23. The method of claim 18, wherein each said conduit is clear in its entirety.

24. An apparatus for determining a direction of flow of a gas in a system having a first port and a second port, said apparatus comprising:

a first conduit having a clear portion and a nozzle;

a second conduit having a clear portion and a nozzle; and a first valve connecting said first conduit to said second conduit;

wherein said first conduit is coupled to said first port and said second conduit is coupled to said second port, said first valve is closed to prevent flow of said gas between said first conduit and said second conduit, a smoke or luminescent mixture enters through one of said nozzles, and wherein said direction of flow of said gas is determined by visually observing flow direction of said smoke or luminescent mixture in one of said conduits through its said clear portion.

25. The apparatus of claim 24, wherein said clear portions include clear tubes.

26. The apparatus of claim 24, wherein said first valve includes:

a release valve; and a release mechanism;

wherein said release mechanism is used to open said release valve for releasing said gas from said first valve.

27. The apparatus of claim 24, wherein said system includes a pneumatic system and a gaseous circuit, said gaseous circuit includes said first port and said second port.

28. The apparatus of claim 24, wherein each said conduit is clear in its entirety.

29. The apparatus of claim 24, further comprising a plurality of adapters for coupling said conduits to said ports.

30. The apparatus of claim 24 further comprising:

a second valve having a first end and a second end, said first end of said second valve being coupled to said nozzle of said first conduit;

a third valve having a first end and a second end, said first end of said third valve being coupled to said nozzle of said second conduit; and an entry nozzle coupled to said second end of said second valve and said second end of said third valve;

wherein said smoke or luminescent mixture is injected into said entry nozzle.

31. A method of detecting a direction of flow of a gas in a system having a first port and a second port, said method comprising the steps:

coupling a first conduit to said first port, said first conduit having a clear portion and a nozzle;

coupling a second conduit to said second port, said second conduit having a clear portion and a nozzle, wherein a first valve connects said first conduit to said second conduit;

closing said first valve to prevent flow of said gas between said first conduit and said second conduit; and providing a smoke or luminescent mixture through one of said nozzles; visually determining said direction of flow of said gas by observing flow direction of said smoke or luminescent mixture in one of said conduits through its said clear portion.

32. The method of claim 31, wherein said clear portions include clear tubes.

33. The method of claim 31 further comprising the step of releasing said gas from said first valve.

34. The method of claim 31, wherein said system includes a pneumatic system and a gaseous circuit, said gaseous circuit includes said first port and said second port.

35. The method of claim 31, wherein each said conduit is clear in its entirety.

36. The method of claim 31 further comprising the step of opening said first valve to allow flow of said gas between said first and said second conduits after said observing step.

37. The method of claim 31 further comprising the steps of:

coupling a first end of a second valve to said nozzle of said first conduit, said second valve having a second end; and coupling a first end of a third valve to said nozzle of said second conduit, said third valve having a second end;

wherein said providing step includes injecting said smoke or luminescent mixture into an entry nozzle coupled to said second end of said second valve and said second end of said third valve.

* * * * *